United States Patent [19]

Westerman, Jr.

[11] Patent Number: 4,519,767

[45] Date of Patent: May 28, 1985

[54] TRANSFER APPARATUS FOR A RECORD MOLDING PRESS

[75] Inventor: Harry H. Westerman, Jr., Danville, Ind.

[73] Assignee: RCA Corporation, Princeton, N.J.

[21] Appl. No.: 619,986

[22] Filed: Jun. 12, 1984

[51] Int. Cl.³ .............................................. B29D 17/00
[52] U.S. Cl. ................................... 425/308; 425/806; 425/810; 425/302.1
[58] Field of Search ............... 425/806, 810, 308, 315, 425/302.1, 123, 501, 437, 114, 116

[56] References Cited

U.S. PATENT DOCUMENTS

| | | | |
|---|---|---|---|
| 3,186,029 | 6/1965 | Joseph | 425/123 |
| 3,514,813 | 6/1970 | Westermann | 425/501 |
| 3,525,382 | 8/1970 | Devol | 425/437 X |
| 3,526,690 | 9/1970 | Bachman | 425/114 X |
| 3,528,127 | 9/1970 | Damm et al. | 425/116 |
| 3,635,622 | 1/1972 | Wechsler | 425/302.1 X |
| 3,662,051 | 5/1972 | Harlow et al. | 425/810 |
| 3,663,136 | 5/1972 | Westermann | 425/116 |
| 3,702,749 | 11/1972 | Flusfeder et al. | 425/308 X |
| 3,833,328 | 9/1974 | Palmer et al. | 425/810 |
| 3,862,815 | 1/1975 | Roczynski et al. | 425/810 |
| 4,005,965 | 2/1977 | Roczynski et al. | 425/810 |

Primary Examiner—J. Howard Flint, Jr.
Attorney, Agent, or Firm—Birgit E. Morris; Edward J. Sites

[57] ABSTRACT

A transfer apparatus is provided for transferring a molded record from the record pressing station to the record trimming station of an automated record press. The transfer apparatus is comprised of a clamp which is circular in its closed position with an interior diameter large enough to hold a record by the flash formed about the outside diameter of the record. The clamp is pivotally mounted so as to oscillate between the record pressing station and the record trimming station. In use, the clamp is positioned in the closed position between the upper and lower molding platens so as to form a molding surface against which the flash is formed in a uniform configuration during molding. After the record is molded, the clamp in the closed position is oscillated to a position in alignment with the record trimming station. The clamp is then opened which releases the record for trimming. The clamp then returns to the record pressing station for the next molding cycle.

7 Claims, 5 Drawing Figures

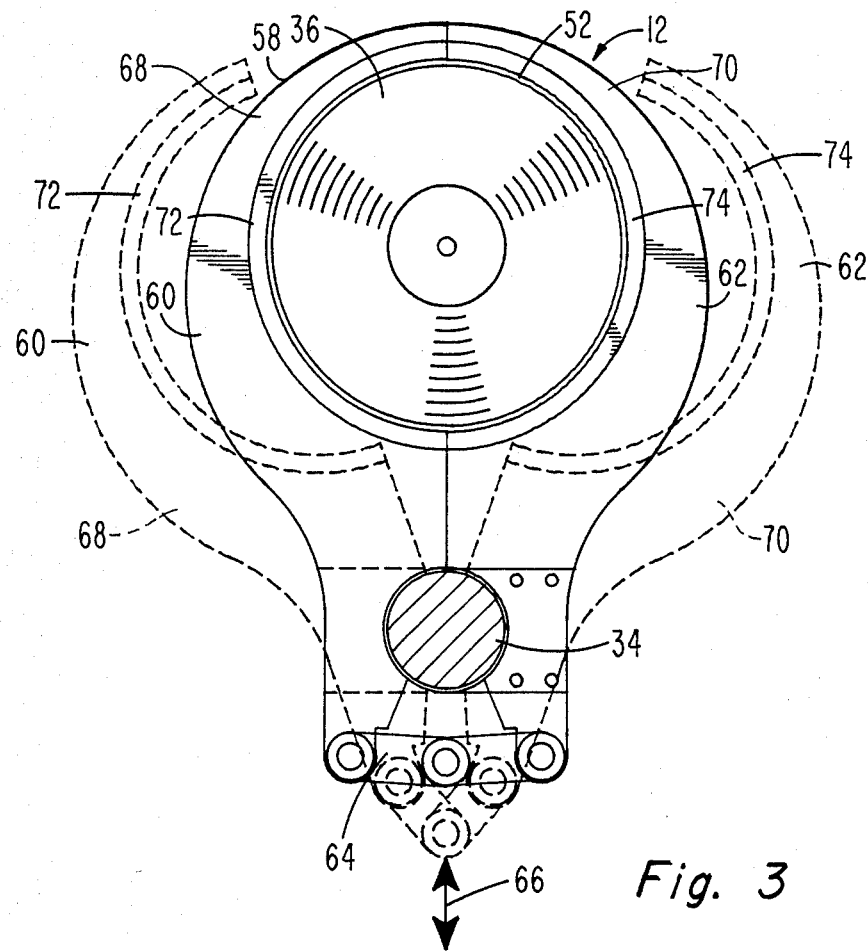
Fig. 3
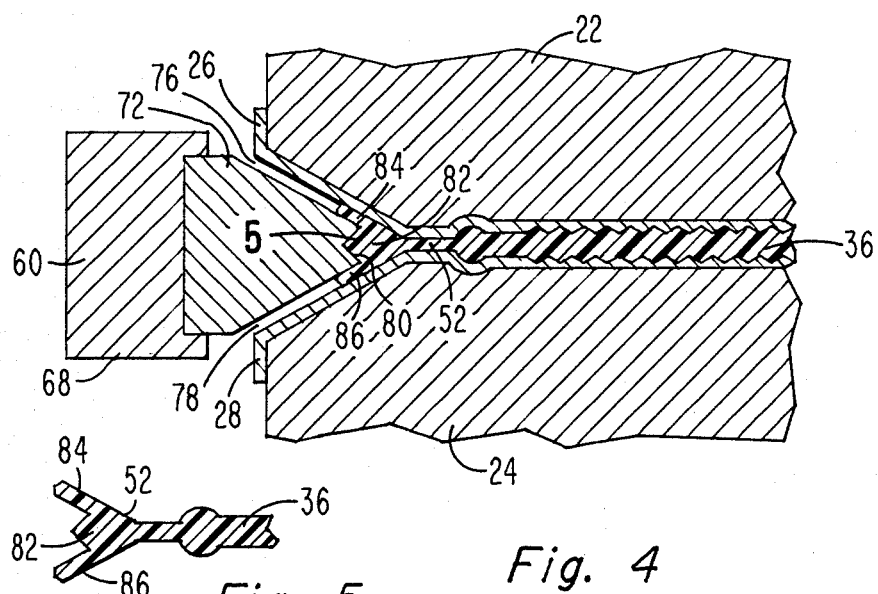
Fig. 4
Fig. 5

TRANSFER APPARATUS FOR A RECORD MOLDING PRESS

This invention relates to an apparatus for transferring a molded record from the record pressing station to the record trimming station of an automated record molding press.

BACKGROUND OF THE INVENTION

Molded records, such as conventional audio records and the more recently developed high density information records, are manufactured by molding a thermoplastic composition between a pair of disc-shaped metal parts referred to as stampers. The stampers have formed in their molding surfaces a negative surface relief image corresponding to the information tracks desired to be formed in the molded record. A charge of a thermoplastic composition which is somewhat in excess of that actually required to form the record is used in order to insure that the molded record will be free of voids and low density areas. During the molding of the record, the excess amount of the thermoplastic composition is forced out from between the stampers and forms a ring of material about the outer edge of the record which is referred to as flash. The molded record with the flash still attached is removed from the surface of the stampers and thereafter, the flash is trimmed from the record. The trimmed record is then stored until it can be placed in a protective envelope, jacket or caddy.

When a relatively large number of records of a particular title are to be molded, it is customary to produce the records on an automated record press. A wide variety of different types of automated record presses have heretofore been suggested, many of which are now commercially available. These automated record presses, while varying considerably in their specific features, are generally characterized by having certain distinct work stations at which specific record manufacturing steps are performed. The work stations typically include, for example, a record pressing station, a record trimming station and generally, an on-machine temporary storage station. The record pressing stations have a press which include a pair of opposing molding platens which can be heated and cooled rapidly. The stampers having the information desired to be molded into the records are mounted on the molding platens. The record pressing station either includes as an integral part thereof or closely associated therewith, an extruder or the like for supplying a predetermined size charge of a thermoplastic composition to the record press in a timed relationship relative to operation of the stations of the record press. The charge of the thermoplastic composition is placed between the stampers mounted on the molding platens. The platens are heated to raise the thermoplastic composition above its melting point for molding and then are cooled to solidify the molten thermoplastic composition in the form of a record. The resulting molded record is then transferred to the record trimming station for removal of the flash. After the record is trimmed, it is then generally transferred to temporary on-machine storage station. Each of the steps in the record manufacturing process generally take place simultaneously with the other steps, that is, while a record is being molded, another record is being trimmed and so forth.

In the operation of an automated record press, it is highly important that there be a precisely timed and accurate transfer of the in-process parts such as the molded but untrimmed record between the work stations. The timing is important in that the faster parts can be transferred from station to station, the faster the automated record molding press can be cycled. The speed of transfer is not, however, as important as the accuracy with which the in-process parts are transferred from work station to work station. If a part such as a charge of the thermoplastic composition is not properly positioned in the record pressing station or a molded but untrimmed record not properly aligned on the record trimming station, it can cause a break in production which may require shutdown of the entire record molding press until the problem can be corrected. It is also important that in-process parts be relatively uniform from part to part so that the same processing condition can be used for all similar parts.

Considerable problems are, however, encountered in the molding of records using automated record presses. Many of these problems can be traced directly or indirectly to the apparatus used to transfer untrimmed molded records from the record pressing station to the record trimming station. As noted above, in the molding operation the excess material in the charge of the thermoplastic composition is pressed out from between the stampers and typically forms an irregular-shaped ring of flash about the outer diameter of the molded record. With transfer apparatus designed to hold the non-uniform flash during transfer, it is often difficult to obtain and maintain a satisfactory grip of the flash. Furthermore, because of the non-uniformity of the flash, the record is often held in an off-center position which in turn causes misalignment of the untrimmed record with the record trimming station. Even if a transfer mechanism is used which contacts the center of the record, the non-uniform flash still often interferes with proper feeding and alignment of the molded record. Attempts have been made to improve the grip of the transfer apparatus to the flash by contacting the flash while still in a molten condition. One such transfer apparatus has an over-sized transfer ring with eyelets which extends inwardly from the inside of the ring to engage the molten flash as it formed. This technique results in an improved grip for transfer purposes, but also results in it being extremely difficult to strip the record from the transfer ring once the record reaches the record trimming station. The resulting flash is also exceptionally irregular as a result of the intrusion of the eyelets into the flash.

Non-uniform flash, a problem normally caused by the molding process or by the transfer ring or a combination of both can cause considerable problems in trimming the flash from the record, such as breakouts, edge cracking and the like, when the cutter blade is brought into contact with the flash.

What would be highly advantageous would be a transfer apparatus for an automated record press which would result in a uniformly-shaped flash; would securely hold an untrimmed record during transfer from the record pressing station to the record trimming station; would accurately position the record on the record trimming station; and would then readily release the record.

SUMMARY OF THE INVENTION

A transfer apparatus is provided for transferring a molded record from the record pressing station to the record trimming station of an automated record press.

The transfer apparatus is comprised of a clamp which is circular in its closed position with an interior diameter large enough to hold a record by flash formed about the outside diameter of the record. The clamp is pivotally mounted so as to oscillate between the record pressing station and the record trimming station. In use, the clamp is positioned in the closed position between the upper and lower molding platens so as to form a molding surface again which the flash is formed in a uniform configuration. After the record is molded, the clamp in the closed position is oscillated to a position in alignment with the record trimming station. The clamp is opened which releases the record for trimming. The clamp then returns to the record pressing station for the next molding cycle.

BRIEF DESCRIPTION OF THE DRAWING

FIG. 3 is a top plan view of the transfer apparatus of this invention with a record held within the clamp of the apparatus in the closed position and with the open position of the clamp being shown in dotted lines.

FIG. 4 is a cross-sectional illustration showing the relationship of the apparatus of this invention during molding to the upper and lower molding platens, the stampers and a record molded with flash on its outer edge.

FIG. 5 is a cross-sectional illustration of the outer edge portion and flash of the untrimmed molded record shown in FIG. 4.

DETAILED DESCRIPTION OF THE INVENTION

Figure 1:
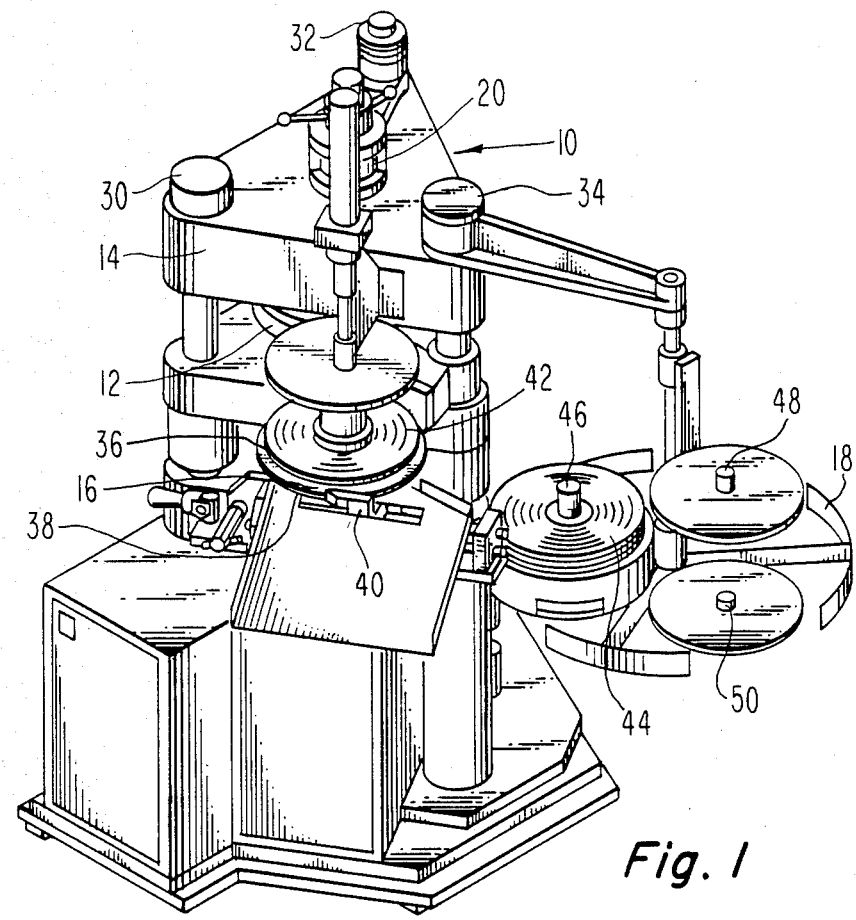
FIG. 1 is a pictorial illustration of an automated record molding press.

In FIG. 1 there is an illustration of an automated record press 10 which includes the transfer apparatus 12 of the present invention. The automated press 10 illustrated in FIG. 1 was selected for purposes of facilitating the explanations of the present invention. It should be appreciated, however, that the transfer apparatus 12 of this invention can be utilized with other types of automated record presses, either exactly as shown in the figures or in a modified form required for a particular press configuration. The automated press 10 illustrated in FIG. 1 has a record pressing station 14, a record trimming station 16 and an on-machine storage station 18. The record pressing section 10 includes a central hydraulic ram 20 which is connected so as to act on the upper and lower molding platens 22, 24 (not shown in FIG. 1). The stampers 26, 28 (not shown in FIG. 1) used to mold the records are mounted on the molding platens 22, 24. The record pressing station 14 is of a generally triangular shape with support posts 30, 32, 34 at each corner. The transfer apparatus 12 of the invention, which will be described in greater detail hereinafter, is pivotally mounted on one of the posts 34 of the record pressing station 14. The record trimming station 16 is positioned adjacent to the record pressing station 14 so as to receive a molded, untrimmed record 36 from the record pressing station 14. The record trimming station 16 has a support turntable 38 for holding a molded record 36 to be trimmed, a cutter 40 positioned to remove the flash 52 and a finished record transport 42 for moving a trimmed record 44 from the record trimming station 16 to the on-machine storage station 18. As illustrated in FIG. 1, the finished record transport 42 is positioned on the same post 34 as the transfer apparatus 12 and is designed to move in tandem with it. The on-machine storage station 18 has a series of storage positions 46, 48, 50 which move in a circular path to receive the finished records 44.

Figure 2:
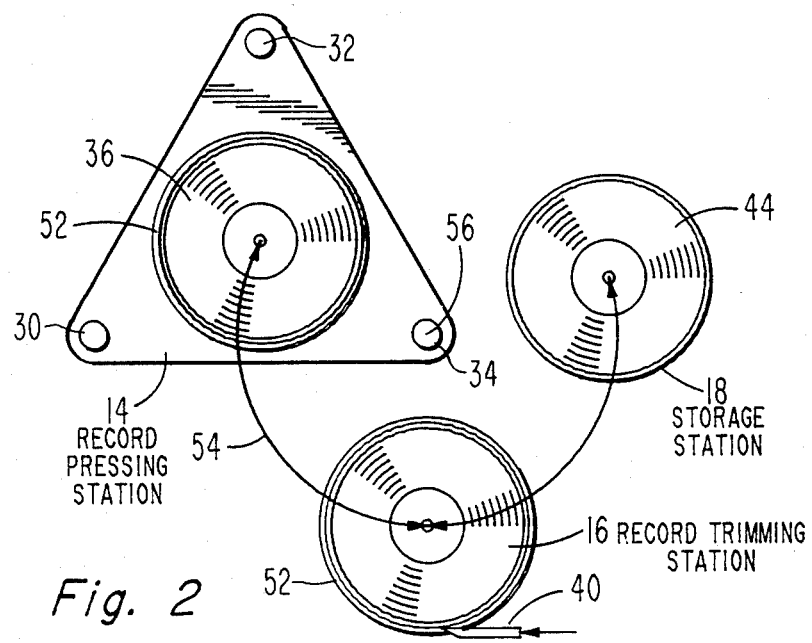
FIG. 2 is a schematic illustration showing the sequence of operation in the automated record press of FIG. 1.

Referring to FIG. 2, the operation of the automated record press 10 involves a series of interrelated steps. The charge of thermoplastic material (not shown) is delivered to the record pressing section 14 where it is pressed into a record 36 with flash 52 on its outer edge. The untrimmed, molded record 36 is transferred from the record pressing station 14 to the record trimming station 16. The transfer apparatus 12 used for this purpose oscillates between the record pressing station 14 and the record trimming station 16 along the path defined by the curved arrow 54. The pivot point 56 about which the transfer apparatus 12 oscillates is in the center of the post 34 of automated record press 10. The post 34 is in a convenient location for mounting the transfer apparatus 12; however, the transfer apparatus 12 could likewise be mounted at another position, for example, outward from the record pressing station 14 where the transfer apparatus 12 can still oscillate between the record pressing station 14 and the record trimming station 16.

Referring now to FIG. 3 there is illustrated in detail the transfer apparatus 12 of this invention. The transfer apparatus 12 includes a clamp 58 which, in its closed configuration, has a cirular interior grip surface as shown in solid line in FIG. 3. The inside diameter of the clamp 58 in the closed position is sufficiently large enough so as to be capable of holding a molded record 36 by the flash 52 formed about the outer diameter of the record 36. The inside opening of the clamp 58 in the open position has an opening which is larger than the diameter of the flash 52 formed on the outer edge of the record 36. The transfer apparatus 12, as illustrated, is comprised of two half-clamp sections 60, 62 which form the right and left sides of the clamp 58 of the transfer apparatus 12. The half-clamp sections 60, 62 are connected together through a linkage 64 which when activated with, for example, an air cylinder (not shown) is urged in the directions indicated by the arrow 66, and will either open or close the clamp 58 as indicated by the dotted and solid lines on FIG. 3. The half-clamp sections 60, 62 are mounted and pivot about the post 34 of the record pressing station 14.

As is best illustrated in FIG. 4, the half-clamp sections 60, 62 have outer portions 68, 70 and inner ring portions 72, 74. The inner ring portions 72, 74 are secured to the outer portions 68, 70 and preferably are heated to control the release of thermoplastic composition from the surface of the inner ring portions 72, 74. The inner ring portions 72, 74 are advantageously of a generally triangular configuration with the angle of the sides being approximately the same as the angle on the sides of the molding platens 22, 24 and stampers 26, 28 so as to define narrow channels 76, 78 between the inner ring portions 72, 74 and the stampers 26, 28 into which flash 52 can flow. In a preferred embodiment of this invention, a vee groove 80 is formed in the apex of the triangular section of the inner ring portions 72, 74. This vee groove 80, as will be explained in greater detail below, provides a diamond-shaped ring 82 of flash 52 for holding the molded record 36. It is also feasible to use a grooved inner edge for improving the grip of the clamp 58 to the flash 52.

In operation, the transfer apparatus 12 is initially positioned in the record pressing section 14 in vertical alignment with the molding platens 22, 24 and their associated stampers 26, 28. The charge of thermoplastic composition is placed between the stampers 26, 28. The half-clamp sections 60, 62 are then closed as illustrated in solid line in FIG. 3. The record press is then operated in the molding mode. As the charge of thermoplastic composition is molded into a record, the space between the stampers 26, 28 fills with the thermoplastic composition to form the record 36. The excess material in the thermoplastic charge flows out past the stampers 26, 28 and against inner ring portions 72, 74 of the transfer apparatus 12 which in effect becomes a molding ring for the flash 52. The vee-shaped groove 80 initially fills up to form a diamond-shaped flash section 82 which is of a uniform shape about the outer diameter of the record 36. Any additional excess thermoplastic composition is forced in the narrow channels 76, 78 between the inner ring portions 72, 74 and the stampers 26, 28 to form thin sections of flash 84, 86. The molding platens 22, 24 are then cooled which causes the thermoplastic composition to solidify. The upper and lower platens 22, 24 are then separated. After sufficient clearance between the platens 22, 24 has been established, the transfer apparatus 12 is oscillated in the closed position as illustrated in solid line in FIG. 3 to the record trimming station 16. Once the untrimmed record 36 is in alignment with the record trimming station 16, the linkage 64 of the transfer apparatus 12 is activated to open the half-clamp sections 60, 62 to the position indicated by the dotted lines on FIG. 3. The record 36 is then readily released from the transfer apparatus 12 to the record trimming station. The transfer apparatus 12 is then cycled back to the starting position and closed for the next molding cycle. The record 36 with the flash 52 still attached to it can then be readily and accurately trimmed at the record trimming station 16.

Superior results are obtained using the transfer apparatus 12 of this invention in molding, transferring and trimming operations. These results are believed to be due at least in part to the unique flash configuration obtained with the transfer apparatus 12 of this invention. As is best seen in FIG. 5, the flash 52 has a regular configuration with a diamond-shaped ring 82. When the transfer apparatus 12 is in the closed position, the diamond-shaped ring 82 is securely held by the inner ring portions 72, 74 of the transfer apparatus 12. However, when the half-clamp sections 60, 62 are opened, the flash 52 is easily and cleanly released. Furthermore, any excess material above that required for the diamond-shaped ring 82 of flash is formed in thin sections which do not interfere with the trimming of the record 36.

What is claimed is:

1. In a record molding press having (a) a record pressing station for use with opposing molding platens on which record stampers are mountable for molding a charge of thermoplastic composition into a record having flash about the outer edge thereof and (b) a record trimming station having means for removing flash from the outer edge of a record; the apparatus for transferring a record with flash on its outer edge from the record pressing station to the record trimming station comprising in combination:
   a clamp means having a closed and an opened position and an operating means for opening and closing the clamp means;
   said clamp means in the closed position having an inside diameter capable of holding a molded record by flash formed on the outer edge of the record and in the open position having an opening larger than the diameter of the flash formed on the outer edge of the record;
   said clamp means being positioned at a predetermined location for oscillation between the record pressing station and the record trimming station and being comprised of first and second opposing pivotally connected clamp halves each having a semicircular inner ring portion which together form the inside diameter of the clamp means;
   said clamp halves further being operatively connected to the operating means for opening and closing the clamp means
whereby when the clamp means is located in the closed position about molding platens in the record pressing station and a charge of a thermoplastic composition is molded between stampers mounted on the molding platens, a record is molded having flash formed about the outer edge of the record in gripping engagement with the inner diameter of the clamp means and whereby after oscillating from the record pressing station to the record trimming station and the clamp means is moved to the open position by the operating means the record is released for trimming of the flash from the outer edge of the record at the record trimming station.

2. The apparatus according to claim 1 wherein the clamp means is positioned on the record pressing station.

3. The apparatus according to claim 1 wherein the semicircular inner ring portions include means for gripping the flash formed on a molded record.

4. The apparatus according to claim 1 wherein the semicircular inner ring portions have a vee groove formed therein for engaging flash formed on the outer edge of a record.

5. The apparatus according to claim 1 wherein the semicircular inner ring portions have configurations which substantially mate with the outer diameter edge of the molding platens when in the molding position.

6. The apparatus according to claim 1 wherein the semicircular inner ring portions have triangular cross sections adopted to substantially mate with a pair of bevelled edge molding platens.

7. The apparatus according to claim 1 wherein the semicircular inner ring portions have triangular cross sections with a vee groove formed in the apex of the triangular cross sections.

* * * * *